Nov. 29, 1966    R. DE MARCELLUS    3,288,538
POWER ASSISTED BRAKING SYSTEM
Filed July 16, 1964
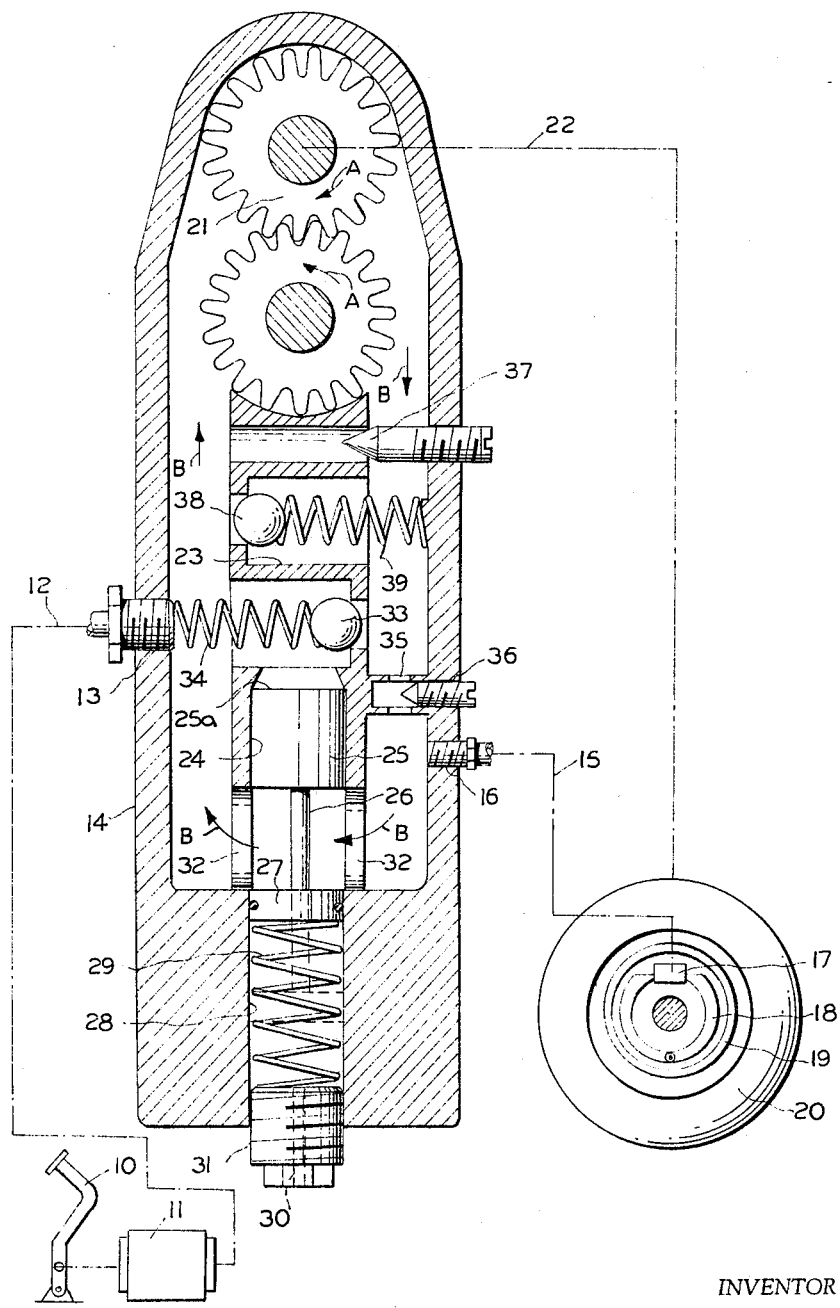
INVENTOR
ROLAND DE MARCELLUS
BY *Paris, Haskell & Revine*
ATTORNEYS

United States Patent Office 3,288,538
Patented Nov. 29, 1966

3,288,538
POWER ASSISTED BRAKING SYSTEM
Roland De Marcellus, 11 E. Erie St., Chicago, Ill.
Filed July 16, 1964, Ser. No. 383,062
14 Claims. (Cl. 303—11)

The present invention relates to power assisted braking systems, and particularly to such braking systems adapted for vehicular use. Because the invention is contemplated as particularly useful for roadway vehicles, such as automobiles and trucks, the invention is described in the context of this environment. However, it is obvious that the invention is not limited to this environment, and its adaptation to other purposes and functions will be apparent to those skilled in the art.

The power for assisting the braking operation in the present invention, as applied to a roadway vehicle, is derived from the wheels, their running assembly, or other drive component of the vehicle, so that the amount of power available to the system is related directly to the speed of the vehicle. Accordingly, while the vehicle is being braked, the amount of power available diminishes as the wheels slow down. This factor, in combination with other elements of the system to be subsequently described, is particularly effective for the purpose of preventing locking of the wheels by overbraking, and for facilitating a smooth braking operation. Braking of the vehicle and control of the power assist is effected by a hydraulic connection with the normal manually operated brake pedal. At the same time, the brake pedal hydraulic line is in direct hydraulic communication with the brake cylinders on the wheels. With this arrangement, the available power assist of the system is designed to be substantially constant over the usual running speed of the vehicle, and to become ineffective at a selected low wheel speed to place the final braking operation under direct hydraulic control of the operator's foot pedal. Also, since the foot pedal is in direct hydraulic communication with the wheel brake cylinders, failure of the power assist would leave the system under normal manual control of the operator.

It is accordingly one object of the present invention to provide a power assisted brake system deriving its power braking force from the wheels or other drive component of the device being braked.

Another object of the invention is to provide such a system with a direct hydraulic control between a manual actuator and the brakes.

Still another object of the invention is to provide such a system wherein the pressure in the system caused by operation of the manual actuator controls the amount of power assist braking force utilized.

And still another object of the invention is to provide for the elimination of any power assist to the braking force when the wheel or other drive component utilized to provide the power assist is operating below a certain speed or related value, leaving the braking force entirely under manual control.

Other objects and various advantages of the present power assisted braking system will become apparent to those skilled in the art from a consideration of the following detailed description of one illustrative embodiment of the invention, had in conjunction with the accompanying drawing, which is a longitudinal sectional view of a power assist mechanism embodying the present invention, shown in a hydraulic braking system otherwise shown schematically.

Referring to the drawing, a hydraulic braking system is there illustrated, and comprises a conventional brake pedal 10, operating through a master cylinder 11, to control the braking force applied to wheel 20, by means of the usual wheel brake cylinder 17, brake shoe 18, and drum 19 mounted on the wheel. Hydraulic coupling between the master cylinder 11 and wheel brake cylinder 17 is effected by lines 12 and 15. For purpose of illustration only one wheel and brake combination is shown, although normally a plurality of wheels and brakes would be employed. A housing 14 containing the power assist mechanism is interposed in the brake lines 12–15 between the master cylinder and the wheel brake cylinders, and line 12 is connected to one side of the housing 14 by means of coupling 13, while the line 15 is connected to the other side of the housing 14 by means of coupling 16.

The power assist braking force is developed by the mechanism within housing 14. To develop power for the system, a gear pump 21 is provided at one end of the housing 14, which is driven by a mechanical connection schematically indicated by the dashed line 22 between one of the gears of the pump and the wheel 20. Of course, any element in the drive to the wheel 20, or in its running assembly that rotates with it could be employed to derive the power for pump 21. Below the pump 21, housing 14 is formed longitudinally with a transverse partition 23 which defines a primary flow circuit for the pump 21. With the vehicle traveling in a forward direction, the gears of the pump 21 rotate in the direction of arrows A, causing fluid to flow in the primary circuit as indicated by the arrows B.

The lower end of the partition 23 is formed with a cylinder 24 housing piston 25, connected by rod 26 to second piston 27, which in turn operates in recess 28 of housing 14 against the force of spring 29. Air may freely escape and enter recess 28 behind piston 27 through aperture 30 in plug 31, so that the only restraint on movement of pistons 25 and 27 is spring 29. A pair of slits 32 in cylinder 24 form a transverse aperture for the flow of fluid in the primary circuit of pump 21.

Upon the application of pressure to foot pedal 10, the piston in master cylinder 11 transmits a manual hydraulic braking force directly to the wheel cylinder 17 through line 12, housing 14, and line 15, and at the same time creates a force on the surface 25a of piston 25, driving this piston downwardly in its cylinder 24 and piston 27 into recess 28 against the force of spring 29. This action causes piston 25 to act as a valve and restrict the flow of fluid in the primary circuit across the slotted aperture 32 in the partition 23. As a result, hydraulic pressure increases on the output side of the pump 21 and in line 15 to the wheel brake cylinder 17. The amount of braking force generated is related to the amount of change in area of aperture 32, which is controlled by the amount of force applied to the foot pedal 10. Upon release of the brake pedal 10, spring 29 returns pistons 25 and 27 to their retracted positions shown in the drawings, returning the pressure in line 15 to a non-braking value.

Since the speed of operation of pump 21 is dependent upon the speed of the vehicle, it is necessary to design the power assist systems so that at high speeds the pressure on the output side of the pump does not reach a value that will start to apply the brakes and the power assist braking forces are nearly or substantially uniform over the normal operating speeds of the vehicle. These ends are accomplished by a combination of spring pressed relief valve 33 and adjustable pressure reducer valve 35. The force of spring 34 acting on valve 33, and the relation of the valve opening at 35 to that at the slotted aperture 32, are selected so that at all speeds there is no autogenous braking force generated in line 15, with the excess pressure of pump 21 being relieved by the bypass flow through relief valve 33. At the same time there is a nearly uniform rate of flow of fluid past valve 35 for all usual operating speeds. However, upon the operation of the brake pedal 10, the flow area in aperture 32 is decreased, causing a pressure increase in the area between aperture 32 and valve 35, and a braking pressure is thus applied to line 15 by means of the power derived from pump 21. Adjustment of the system to proper operating relationship can be readily effected by setting screw 36 to obtain the proper valve aperture at 35.

For most effective and efficient braking of an automotive vehicle, it is best that the wheels not lock. The present system contributes to this end, because at very slow speeds the amount of power assist braking pressure is reduced with decreasing vehicle speed, and at some selected speed the power assist is eliminated. Assuming the vehicle is traveling at a given speed and the brakes are applied with full force, the hydraulic pressure obtainable from pump 21 might be sufficient to lock the wheels when they are brought to a slow speed. However, before the wheels lock, as soon as they slow down, the pump 21 is slowed therewith. Because of this relationship, a smooth non-locking braking effect is obtainable. Additionally to the end of smooth braking control, at some slow speed of say a few miles per hour it is preferable to return braking control entirely to manual operation and cut out the power assist completely. Bypass valve 37 accomplishes this objective. The bypass flow aperture of valve 37 is adjusted by means of its screw stem so that substantially all the fluid flow from pump 21 at the selected low speed is bypassed at this point. The foot pedal pressure generated at the master cylinder 11 will then be transmitted primarily through the check valve 38, whose retaining spring 39 is very light and offers very little resistance to the transmission of pedal force from line 12 to line 15, effecting the final braking entirely by manual operation. When pressure is removed from pedal 10, it is apparent that hydraulic pressure on the wheel brake is relieved through aperture 32 and valve 37.

Check valve 38 also serves two other purposes. In the event of a breakdown in the power assist system, this valve affords a direct hydraulic path for manual application of the brakes at all times and all operating speeds. In the description of the power assist braking operation thus far had, it was assumed that the vehicle is moving forward. When moving in reverse, the pump 21 is also operating in reverse. The reverse pressure of the pump is relieved through valve 38, and for braking, reliance is had entirely upon the manual operation described.

There has thus been described a power assist braking system, particularly applicable to motor vehicles, although not necessarily limited thereto. It is a system that is quite simple in structure and inexpensive, and is one which is fail safe in that at all times complete manual or unassisted braking operation is available. Further, the system is particularly effective and efficient in operation, in that locking of the wheels is quite unlikely. Also, to further insure smoothness of operation, at a selected very low speed, power assist is completely eliminated, leaving the final braking operation entirely under direct hydraulic manual control.

It is understood that the foregoing description of one embodiment of the invention is only illustrative, and is presented to facilitate a complete understanding of the invention. Numerous modifications of and variations in this embodiment will be apparent to those skilled in the art, and accordingly such modifications and variations as are embraced by the spirit and scope of the appended claims are contemplated as within the purview of this invention.

I claim:

1. A power assisted braking system for a movable member whose motion is to be controlled by said system, comprising a manually operated actuator, a brake mechanism cooperating with said member for slowing its motion, a line providing fluid communication between said actuator and brake mechanism, means associated with said actuator for increasing and decreasing the fluid pressure in said line in response to operation of said actuator and thereby operating said brake mechanism, and a power assist mechanism in said line comprising a pump, means defining a fluid flow path between the outlet and inlet of said pump, a variable valve in said flow path, a pressure responsive controller for said valve located in said flow path on a first flow path side of said valve, said first side of said flow path being in fluid communication with said actuator associated means and the other side of said flow path from said valve being in fluid communication with said brake mechanism, and means coupling said movable member and pump for driving said pump at a rate proportional to the rate of motion of said movable member; whereby increases and decreases of pressure in said line by said actuator associated means effect a closing and opening of said valve by said controller, to cause increases and decreases in pump outlet pressure and corresponding changes in fluid pressure applied to said brake mechanism.

2. A system as set forth in claim 1, and further including means in said flow path coupling said two sides thereof for bypassing a predetermined quantity of fluid flow in said flow path around said valve.

3. A system as set forth in claim 1, and further including a one way valve means for permitting fluid flow from said first side of said flow path to said other side thereof.

4. A system as set forth in claim 1, and further including a relief valve means for permitting fluid flow from said other side of said flow path to said one side thereof when the pressure in said other side exceeds a predetermined value.

5. A system as set forth in claim 1, and further including in said other side of said flow path a valve in series with said variable valve to control the fluid pressure in the path therebetween, and said fluid communication with said brake mechanism being obtained from between said two valves.

6. A power assisted braking system for a movable member whose motion is to be controlled by said system, comprising means for deriving power from said movable member proportionate to the rate of movement thereof and converting said power to an hydraulic flow within a circuit path having first and second sides, a brake mechanism cooperating with said member, manually operable means, hydraulic pressure communicating means coupling said manually operable means and said brake mechanism for direct actuation of said brake mechanism by said manually operable means, and means incorporated in said coupling means between said first and second sides responsive to said manually operable means for applying said derived power to said brake mechanism through a portion of said coupling means, said first side of said circuit path being in fluid communication with said manually operable means and said second side of said circuit path being in fluid connection with said brake mechanism.

7. A system as set forth in claim 6, and further including means for substantially eliminating the application of said derived power to said brake mechanism when the rate of movement of said member is below a predetermined value.

8. In combination with an automotive vehicle having wheels, a running assembly for said wheels, and a drive train coupled to at least a portion of said wheels, means coupled to at least one element selected from said wheels, running assembly, and drive train for deriving power therefrom proportionate to the rate of movement thereof, a brake mechanism cooperating with at least one of said wheels, manually operable means, means coupling said manually operable means and said brake mechanism for direct actuation of said brake mechanism by said manually operable means, means responsive to said manually operable means for applying said derived power to said brake mechanism, and means for substantially eliminating the application of said derived power to said brake mechanism when the value of said derived power falls below a selected value but while it still obtains a significant value.

9. A combination as set forth in claim 8, wherein said responsive means is incorporated in said coupling means, and operates to apply said derived power to at least a portion of said coupling means.

10. A power assisted braking system for an automotive vehicle having wheels, a running assembly for said wheels, and a drive train coupled to at least a portion of said wheels, comprising means coupled to at least one element selected from said wheels, running assembly, and drive train for deriving power therefrom proportionate to the speed of the vehicle, a brake mechanism cooperating with at least one of said wheels for slowing the vehicle, a manually operated actuator, a line providing fluid communication between said actuator and brake mechanism, means associated with said actuator for increasing and decreasing the fluid pressure in said line in response to operation of said actuator and thereby operating said brake mechanism, and a power assist mechanism in said line comprising a pump, means defining a fluid flow path between the outlet and inlet of said pump, a variable valve in said flow path, a pressure responsive controller for said valve located in said flow path on a first flow path side of said valve, said first side of said flow path being in fluid communication with said actuator associated means and the other side of said flow path from said valve being in fluid communication with said brake mechanism, the first recited means being coupled to said pump for driving said pump at a rate proportionate to the vehicle speed, whereby increases and decreases of pressure in said line by said actuator associated means effect a closing and opening of said valve by said controller, to cause increases and decreases in pump outlet pressure and corresponding changes in fluid pressure applied to said brake mechanism.

11. A system as set forth in claim 10, and further including means in said flow path coupling said two sides thereof for bypassing a predetermined quantity of fluid flow from said valve.

12. A system as set forth in claim 11, and further including a one way valve means for permitting fluid flow from said first side of said flow path to said other side thereof.

13. A system as set forth in claim 12, and further including a relief valve means for permitting fluid flow from said other side of said flow path to said one side thereof when the pressure in said other side exceeds a predetermined value.

14. A system as set forth in claim 13, and further including in said other side of said flow path a valve in series with said variable valve to control the fluid pressure in the path therebetween, and said fluid communication with said brake mechanism being obtained from between said two valves.

References Cited by the Examiner
UNITED STATES PATENTS
3,124,220  3/1964  Kell _____ 303—21 X
FOREIGN PATENTS
543,418  2/1942  Great Britain.

EUGENE G. BOTZ, *Primary Examiner.*